(12) United States Patent
Bacque et al.

(10) Patent No.: US 6,754,413 B2
(45) Date of Patent: Jun. 22, 2004

(54) OPTICAL MULTIPLEXER, DEMULTIPLEXER AND METHODS

(75) Inventors: James Benson Bacque, Ottawa (CA); Patrick Chilufya Chimfwembe, Ottawa (CA); Alex Ngi, Ottawa (CA); Colin Geoffrey Kelly, Ottawa (CA)

(73) Assignee: Tropic Networks Inc., Kanata (CA)

( * ) Notice: Subject to any disclaimer, the term of this patent is extended or adjusted under 35 U.S.C. 154(b) by 156 days.

(21) Appl. No.: 10/259,597

(22) Filed: Sep. 30, 2002

(65) Prior Publication Data

US 2003/0026530 A1 Feb. 6, 2003

Related U.S. Application Data

(63) Continuation-in-part of application No. 09/839,487, filed on Apr. 23, 2001, now abandoned.
(51) Int. Cl.[7] .............................. G02B 6/28; G02B 6/293
(52) U.S. Cl. .............................. 385/24; 385/15; 385/16; 385/39; 385/123; 398/82; 398/84
(58) Field of Search .............................. 385/24, 15, 16, 385/39, 123; 359/130, 127, 341, 124; 398/82–84

(56) References Cited

U.S. PATENT DOCUMENTS

| | | | | | |
|---|---|---|---|---|---|
| 5,461,685 | A | * | 10/1995 | Glance et al. | 385/24 |
| 5,491,582 | A | * | 2/1996 | Fujita | 359/341.1 |
| 5,680,490 | A | * | 10/1997 | Cohen et al. | 385/24 |
| 2002/0012144 | A1 | * | 1/2002 | Lin et al. | 359/130 |
| 2002/0131689 | A1 | * | 9/2002 | Feuer et al. | 385/24 |

OTHER PUBLICATIONS

"BMX™ Series", Preliminary Specifications, Feb. 2001, 2001 MetroPhotonics Inc., pp. 1 to 4.

* cited by examiner

Primary Examiner—John D. Lee
Assistant Examiner—Eric Wong
(74) Attorney, Agent, or Firm—Victoria Donnelly

(57) ABSTRACT

Methods and devices are provided for optical demultiplexing and optical multiplexing. An optical wavelength demultiplexer adapted to perform wavelength demultiplexing of an input optical signal containing a plurality of wavelengths is provided. A tuneable filter in combination with a device with a required free spectral range results in a tuneable demultiplexer arrangement which eliminates the need to inventory large numbers of different demultiplexers. Similarly, tuneable lasers in combination with a device with a required free spectral range result in a tuneable multiplexer arrangement.

21 Claims, 8 Drawing Sheets

US 6,754,413 B2

OPTICAL MULTIPLEXER, DEMULTIPLEXER AND METHODS

RELATED APPLICATION

This application is a Continuation-In-Part application of U.S. patent application Ser. No. 09/839,487 to Bacque, et al, filed on Apr. 23, 2001, and entitled "Optical Multiplexer, Demultiplexer and Methods" (now abandoned).

FIELD OF THE INVENTION

The invention relates to methods and apparatuses for performing multiplexing functions on groups of optical signals, and performing demultiplexing functions on multi-channel optical signals.

BACKGROUND OF THE INVENTION

It is a common demultiplexing problem in optical systems to have an optical signal containing multiple wavelengths each at a different wavelength from which one or more individual channels must be extracted. The traditional solution to this problem has been to employ a wavelength specific demultiplexing device to extract the required wavelengths. Referring to FIG. 1, shown is an example of such a wavelength specific demultiplexer, generally indicated by 11. The input to the demultiplexer is a group of wavelengths having wavelength $\lambda_1, \ldots, \lambda_{64}$. In order to extract four particular wavelengths, $\lambda_A, \lambda_B, \lambda_C, \lambda_D$, the demultiplexer 11 is provided which extracts those specific wavelengths and passes them to respective receivers 12, 14, 16 and 18. The demultiplexer 11 is specifically designed for the particular wavelengths $\lambda_A, \lambda_B, \lambda_C, \lambda_D$ which are being extracted. Typically the demultiplexer 11 and four receivers 12, 14, 16 and 18 might be delivered on a card 10. In order to allow the demultiplexing of any arbitrary four wavelengths from a set of a possible 64, it would be necessary to inventory 635, 376 different such cards. More realistically perhaps, given the recent propensity towards grouping wavelengths into bands of consecutive wavelengths, in order to allow the demultiplexing of any consecutive group of four wavelengths in a 64 wavelength system, for example $\{\lambda_1, \ldots \lambda_4\}$, $\{\lambda_5, \ldots \lambda_8\}, \ldots, \{\lambda_{61}, \ldots, \lambda_{64}\}$ there would be a requirement to inventory 16 different demultiplexer cards.

This same problem exists on the multiplexing side, namely that a large number of wavelength specific devices must be manufactured and inventoried in order to provide multiplexing flexibility.

SUMMARY OF THE INVENTION

Methods and devices are provided for optical demultiplexing and optical multiplexing.

One broad aspect of the invention provides an optical wavelength demultiplexer adapted to perform wavelength demultiplexing of an input optical signal containing a plurality of wavelengths. The demultiplexer has a wavelength selective element adapted to act upon the input optical signal to produce an output containing a selected subset of the plurality of wavelengths, and as a band-modulo demultiplexer having a free spectral range, the band-modulo demultiplexer being connected to receive the output of the wavelength selective element.

In some embodiments, the wavelength selective element is adapted to produce the output containing the selected subset consisting of an arbitrary subset of wavelengths from the plurality of wavelengths.

In some embodiments, the wavelength selective element is adapted to produce the output containing the selected subset consisting of an arbitrary subset of wavelengths from the plurality of wavelengths subject to a constraint that no two wavelengths in the arbitrary subset are separated by a multiple of the free spectral range.

In some embodiments, the wavelength selective element is adapted to select a contiguous set of wavelengths In some embodiments, the wavelength selective element is a bandpass filter having a passband.

In some embodiments, the wavelength selective element comprises a bank of components which are individually selectable, each component being adapted to select a respective contiguous set of wavelengths.

In some embodiments, each component is a bandpass filter having a passband.

In some embodiments, a guardband is provided between sets of contiguous wavelengths, and the FSR is substantially equal to a width of the contiguous set of wavelengths plus the guardband.

Another broad aspect of the invention provides an optical wavelength demultiplexer adapted to perform wavelength demultiplexing of an input optical signal containing a plurality of wavelengths. The demultiplexer has a band-modulo demultiplexer having a free spectral range, the band-modulo demultiplexer being connected to receive the input optical signal, and adapted to act upon the input optical signal to produce a plurality of intermediate output signals each containing one or more of the plurality of wavelengths each separated by the free spectral range. For each of at least one of the plurality of intermediate output signals, there is a respective wavelength selective device adapted to produce a selected subset of the intermediate output signal's one or more wavelength channels.

In some embodiments, each wavelength selective device comprises at least one component adapted to pass a contiguous band of wavelengths.

In some embodiment, the component is a bandpass filter.

In some embodiments, the wavelength selective devices comprise a plurality of static bandpass filters which are individually selectable, each bandpass filter having a passband width substantially equal to the free spectral range of the band-modulo demultiplexer.

In some embodiments, the wavelength selective devices comprise a plurality of static bandpass filters which are individually selectable, with a guardband being defined between a passband of each bandpass filter, such that for each filter, the guardband plus passband width is substantially equal to the free spectral range of the band-modulo demultiplexer.

In some embodiments, each wavelength selective device comprises a tuneable bandpass filter having a passband width less than the free spectral range of the band-modulo demultiplexer thereby allowing a guard band between bands of wavelengths.

In some embodiments, each wavelength selective element is adapted to filter an arbitrary subset of wavelengths from the plurality of wavelengths subject to a constraint that no two wavelengths are separated by a multiple of the free spectral range.

Another broad aspect of the invention provides an optical wavelength demultiplexer adapted to perform wavelength demultiplexing of an input optical signal containing a plurality of wavelengths. The demultiplexer has a fixed wavelength selective element adapted to act upon the input optical signal to produce an output containing a selected subset of the plurality of wavelengths and has a band-modulo demultiplexer having a free spectral range, the band-modulo demultiplexer being connected to receive the output of the wavelength selective element.

Another broad aspect of the invention provides an optical wavelength demultiplexer adapted to perform wavelength demultiplexing of an input optical signal containing a plurality of wavelengths. The multiplexer has a wavelength selective element adapted to act upon the input optical signal to produce an output containing a selected subset of the plurality of wavelengths, the wavelength selective element comprising a plurality of components each adapted to select a respective subset of the plurality of wavelengths, and switching circuitry for selecting one of the plurality of components to be active at a given time; and a band-modulo demultiplexer having a free spectral range, the band-modulo demultiplexer being connected to receive the output of the wavelength selective element.

Another broad aspect of the invention provides an optical wavelength demultiplexer adapted to perform wavelength demultiplexing of an input optical signal containing a plurality of wavelengths. The multiplexer has a tuneable wavelength selective element adapted to act upon the input optical signal to produce an output containing a selected subset of the plurality of wavelengths; a band-modulo demultiplexer having a free spectral range, the band-modulo demultiplexer being connected to receive the output of the wavelength selective element.

Another broad aspect of the invention provides an optical wavelength multiplexer adapted to perform wavelength multiplexing of a plurality of input optical signals each containing a plurality of wavelengths. The multiplexer has a band-modulo multiplexer having a free spectral range, the band-modulo multiplexer having a plurality of inputs with one input for each of the plurality of input optical signals, the band-modulo multiplexer producing a multiplexed output signal, the band-modulo multiplexer being adapted to combine as the multiplexed output signal for each input any input optical wavelengths in a respective predetermined set of possible wavelengths, each possible wavelength in the set being separated by the free spectral range.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
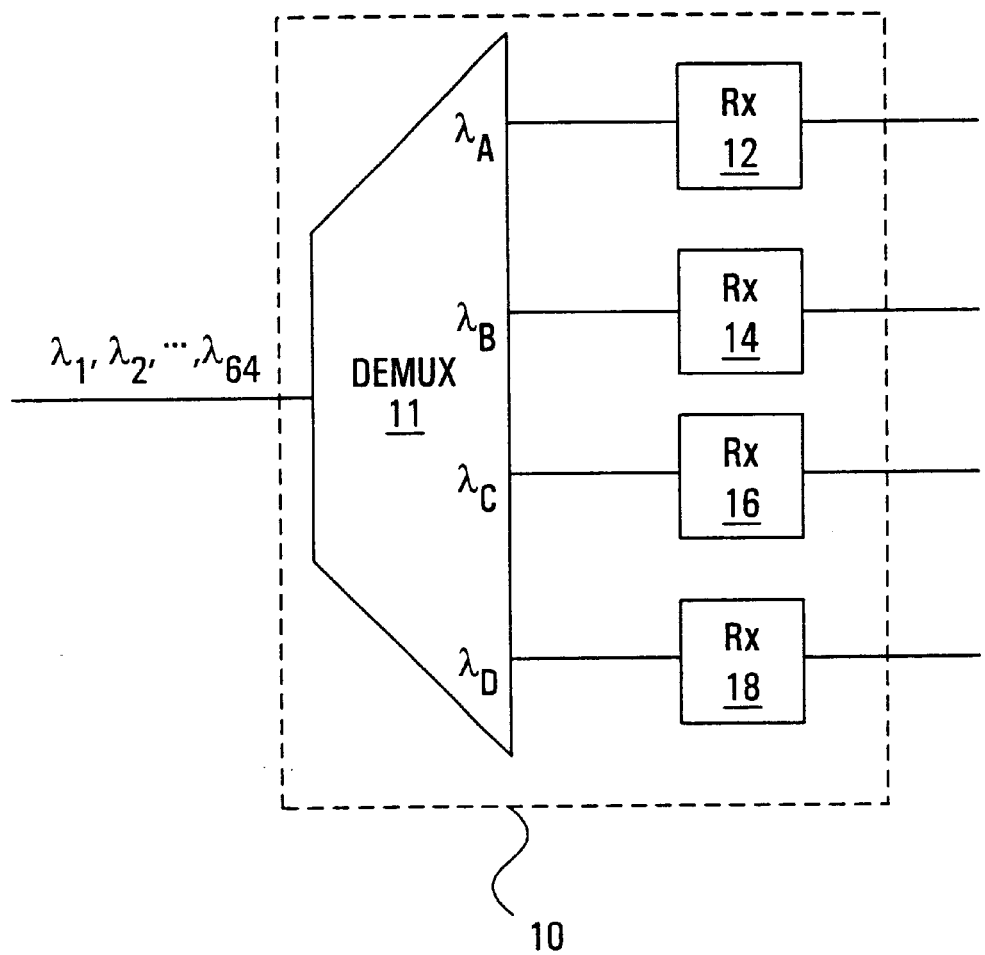
FIG. 1 is a block diagram of a conventional multi-wavelength demultiplexer.
Figure 2:
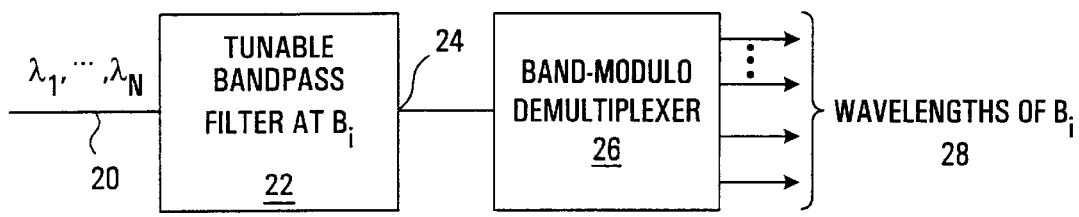
FIG. 2 is a block diagram of an optical demultiplexer provided by an embodiment of the invention.

Referring now to FIG. 2, shown is a block diagram of a demultiplexer according to an embodiment of the invention. The demultiplexer has an input optical transmission medium 20 adapted to contain a multi-band optical signal containing multiple wavelengths, $\lambda_1, \ldots, \lambda_N$. For example, there might be N=64 different wavelengths. The input optical transmission medium is connected to a tuneable bandpass filter 22, the output 24 of which is connected to a band-modulo demultiplexer 26.

The input wavelengths $\lambda_1, \ldots, \lambda_N$ are logically divided into K bands $B_1, \ldots, B_K$ each containing M=N/K consecutive wavelengths of the input wavelengths $\lambda_1, \ldots, \lambda_N$. For example, for the N=64 wavelength embodiment, M might be four in which case there are K=64/4=16 bands of wavelengths, the first of which is $B_1=\lambda_1, \ldots, \lambda_4$, the second of which is $B_2=\lambda_5, \ldots, \lambda_8$, and the last of which is $B_{16}=\lambda_{61}, \ldots, \lambda_{64}$. The tuneable bandpass filter 22 has a passband equal in width to the bands of wavelengths, and is tuneable such that it can be centered to have a passband which overlaps with any particular one of the K bands $B_1, \ldots B_K$. Thus the output 24 of the tuneable band pass filter 22, once tuned, consists of the wavelengths in a selected band $B_i$ only. This output is connected to the band-modulo demultiplexer 26 which separates the wavelengths of the band $B_i$ selected by the tuneable bandpass filter 22 into outputs 28 which are individual substituent wavelengths of the band $B_i$.

Figure 3:
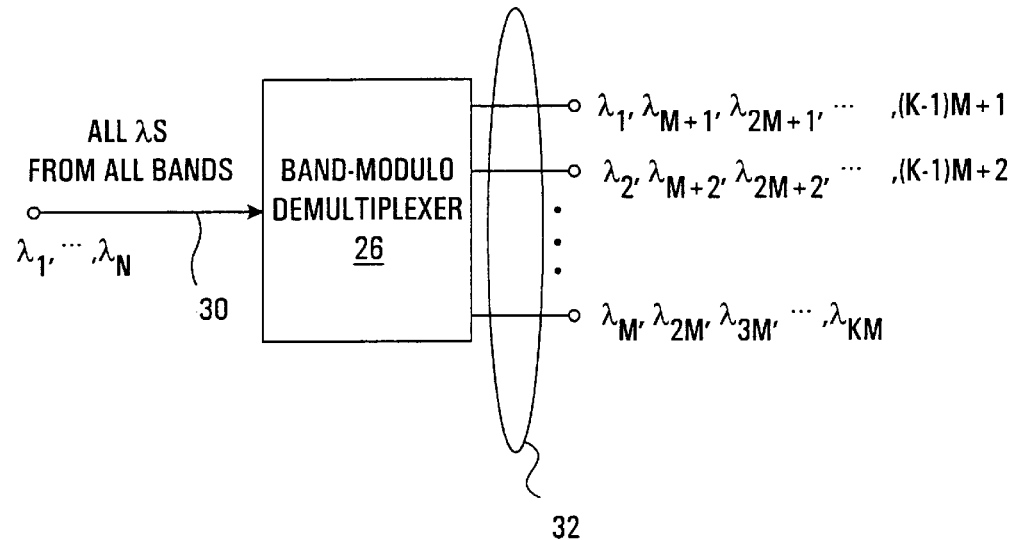
FIG. 3 is a schematic diagram of the band-modulo demultiplexer of FIG. 2.

The band-modulo demultiplexer 26 is a device which takes as input a spectrum of wavelengths, preferably with constant channel spacing in frequency, and outputs to more than two ports such that each port outputs a different group of wavelengths that are separated by the FSR (free spectral range) of the device. The free spectral range of the device is the range of wavelengths in a given spectral order for which superposition of light from adjacent orders does not occur. Referring now to FIG. 3 which shows the behaviour of the band-modulo demultiplexer 26 in isolation, the band-modulo demultiplexer 26 has a single input 30 (received from output 24 when connected to filter 22), and has a number of outputs 32 (analogous to outputs 28 when the filter 22 is present) equal to the number M of wavelengths in each band. In the example described above, M is set equal to four. The band-modulo demultiplexer 26 performs a demultiplexing function of wavelengths modulo M=number of wavelengths in a band. The band-modulo demultiplexer 26 does not perform a demultiplexing function down to the individual wavelength, but rather outputs groups of wavelengths separated by M wavelengths (this being the FSR of the device). Assuming all possible N input wavelengths are input to the band-modulo demultiplexer, the outputs of the band-modulo demultiplexer may be summarized as follows:

Output 1=$\lambda_1, \lambda_{M+1}, \lambda_{2M+1}, \ldots, \lambda_{(K-1)M+1}$.

Output 2=$\lambda_2, \lambda_{M+2}, \lambda_{2M+2}, \ldots, \lambda_{(K-1)M+2}$.

Output 3=$\lambda_3, \lambda_{M+3}, \lambda_{2M+3}, \ldots, \lambda_{(K-1)M+3}$.

. . .

Output M=$\lambda_M, \lambda_{2M}, \lambda_{3M}, \ldots, \lambda_{KM}$.

In embodiments in which bands are employed, preferably the FSR is set to equal the frequency spacing between corresponding wavelengths in each band. Using the above notation, the FSR will be set to equal the frequency of $\lambda_{M+1}$ minus the frequency of $\lambda_1$ for example. In one embodiment, each of the N wavelengths are equally spaced in frequency.

In another embodiment, the bands each contain M equally spaced frequencies, but a guard band is provided between bands.

In another embodiment, the bands each contain M frequencies which are not equally spaced, but with the spacing of the frequencies within a given band being equal across bands. Guard bands can also be employed in this embodiment.

Referring now again to FIG. 2, the tuneable band pass filter 22, once tuned, serves to eliminate all of the wavelengths being input to the band-modulo demultiplexer 26 except the M wavelengths of a single band $B_i$. The band-modulo demultiplexer 26 performs its modulo demultiplexing function on the wavelengths of the single band. Since no two of the input wavelengths are separated by more than the FSR of the demultiplexer 26, each output of the band-modulo demultiplexer 26 contains only a single wavelength of the selected band $B_i$. For example, if the tuneable band pass filter 22 is tuned to allow $B_2 = \lambda_{M+1}, \lambda_{M+2}, \ldots, \lambda_{2M}$ to be input to the band-modulo demultiplexer 26, the band-modulo demultiplexer 26 separates each of these wavelengths into a separate respective output 28.

Advantageously, the arrangement of FIG. 2 can be mass-produced, and tuning the arrangement to produce a demultiplexer function specific to a particular band $B_i$ simply involves tuning the tuneable band pass filter 22 to pass the particular band.

Figure 4:
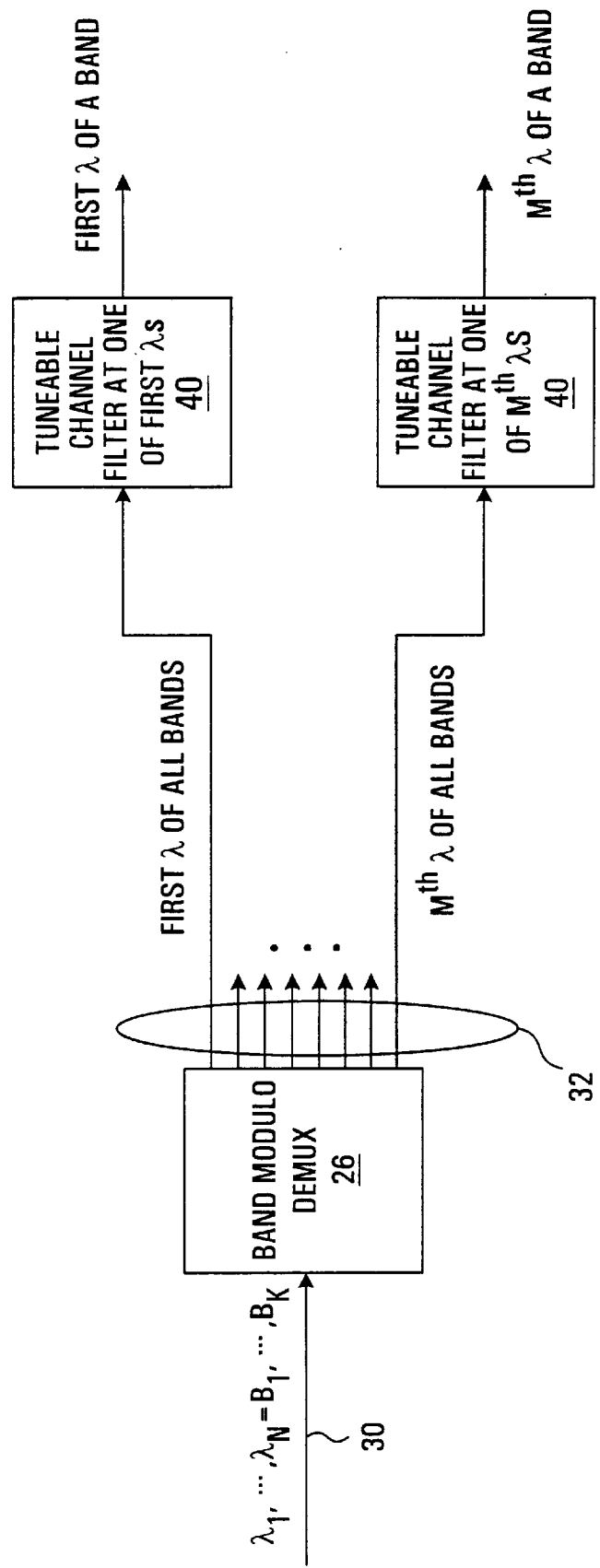
FIG. 4 is a block diagram of an optical demultiplexer according to another embodiment of the invention.

Referring now to FIG. 4, in another embodiment of the invention, the band-modulo demultiplexer 26 of FIG. 3 is connected to receive an input optical signal 30 containing the wavelengths $\lambda_1, \ldots, \lambda_N$ so as to produce M outputs containing multiple wavelengths as described above. Each output is connected to a respective tuneable channel filter 40 (only two shown) which is tuneable to pass one or more of the multiple wavelengths it receives. For example, the first of the outputs 32 contains the "first" wavelength of each band $B_1, \ldots, B_K$. The tuneable channel filter 40 receiving that output can be tuned to extract any particular first wavelength. This allows the flexibility of choosing at each output any one of the respective group of wavelengths output by the band modulo demultiplexer. Advantageously, since the wavelengths input to each tuneable channel filter 40 are separated by at least the FSR of the band-modulo demultiplexer 26, the design constraints/tolerances of the filter 40 are very relaxed.

The above designs can be applied to any set of wavelengths of interest. In one example, the input set of wavelengths $\{\lambda_1, \ldots, \lambda_N\}$ is in the lower C band (194.15 to 196.1 THz) with 50 GHz spacing between wavelength frequencies, with the longest and shortest wavelengths in a given band $B_i$ differing in frequency by 350 GHz. This results in 5 bands $B_i$ each containing 8 wavelengths for a total of 40 wavelengths. In this example, N=40, M=8, and K=5.

In another example, the input set of wavelengths $\{\lambda_1, \ldots, \lambda_N\}$ is in the upper C band (192.1 to 194.1 THz) with 50 GHz spacing between wavelength frequencies, with the longest and shortest wavelengths in a given band $B_i$ differing in frequency by 400 GHz. This results in 5 bands $B_i$ each containing 8 wavelengths for a total of 40 wavelengths. In this example, N=40, M=8 and K=5.

The band-modulo demultiplexer 26 may be implemented using any suitable "FSR device", this being any optical element or combination of elements which exhibit the required FSR. For example, in one embodiment, the band-modulo demultiplexer is a grating based structure, and preferably an Echelle grating based structure. Echelle gratings are available for example from Metro Photonics Inc. of Ottawa, Canada. Conventionally, the FSR has been thought of as a limitation of the usefulness of Eshelle gratings. By designing an Echelle grating having a free spectral range equal to the wavelength separation of wavelengths output by a given channel, the required band-modulo demultiplexing function is achieved. Preferably, the FSR is substantially equal to the bandpass width of the tuneable bandpass filter. In another embodiment, the FSR is smaller than the bandpass width of the tuneable bandpass filter in which case each output may have more than one wavelength. For example, having the FSR equal to one half the bandpass width of the tuneable bandpass filter will result in each output of the arrangement containing two wavelengths separated by the FSR.

In another embodiment, the FSR is broader than the passband width of the tuneable bandpass filter. This will result in gaps in the set of wavelengths which are demultiplexible by the arrangement. This can be employed to provide a guard band of one or more wavelengths between bands of interest.

Figure 5:
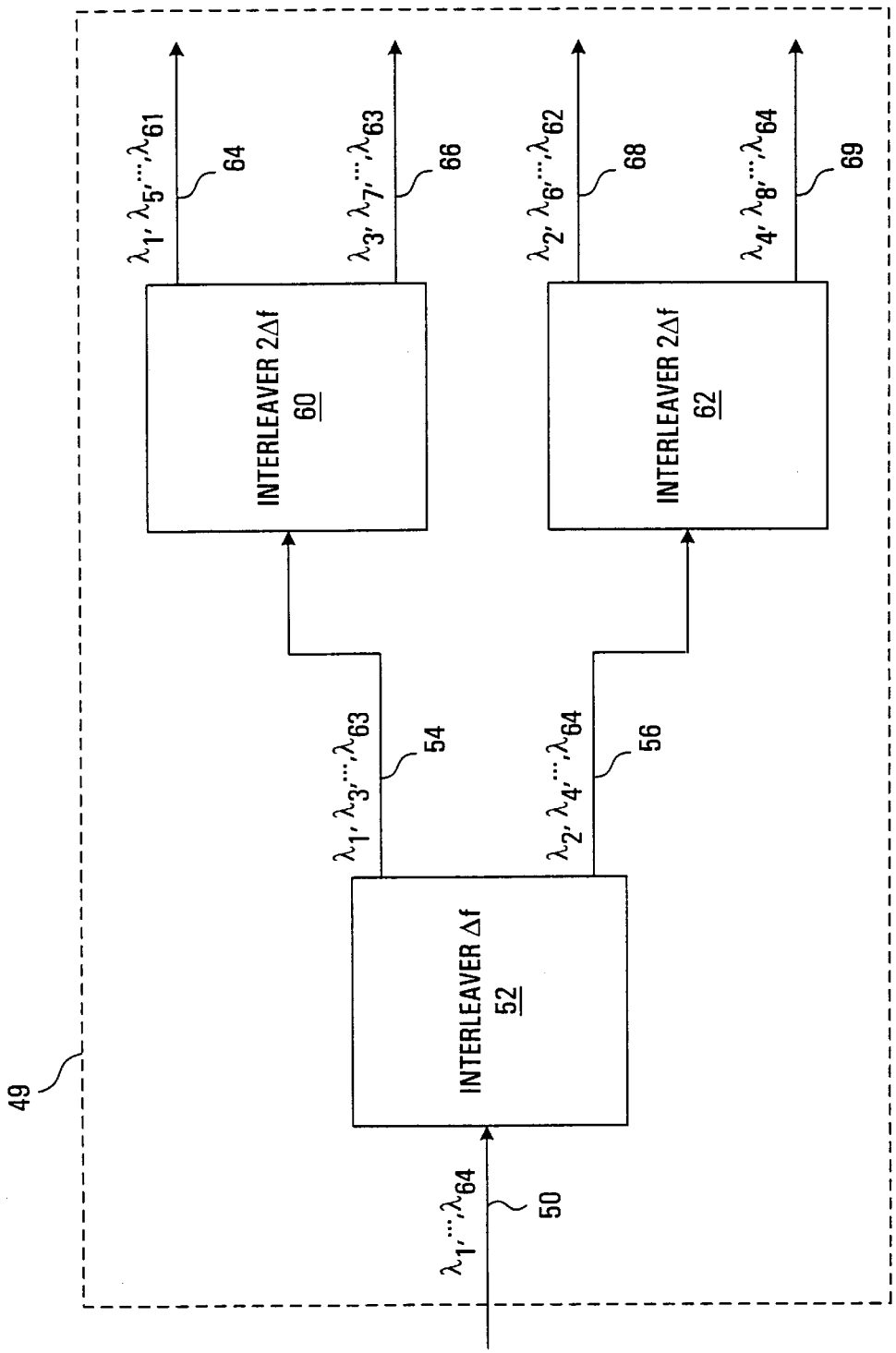
FIG. 5 is a schematic diagram of an interleaver based band-modulo demultiplexer provided by another embodiment of the invention.

In another embodiment, the band-modulo demultiplexer 26 of FIGS. 2 and 3 is an interleaver-based structure. Referring to FIG. 5, an interleaver-based design for the case N=64 (64 wavelengths in total), K=16 (sixteen bands), and M=4 (four wavelengths in each band) is generally indicated by 49. The input optical signal potentially having any of 64 possible wavelengths $\{\lambda_1, \ldots, \lambda_{64}\}$ is fed to a first interleaver 52 which separates the wavelengths into an output 54 carrying the odd wavelengths $\{\lambda_1, \lambda_3, \ldots, \lambda_{63}\}$ and an output 56 carrying the even wavelengths $\{\lambda_2, \lambda_4, \ldots, \lambda_{64}\}$. The two outputs 54,56 are connected to respective interleavers 60,62. Interleaver 60 further interleaves the odd wavelengths to produce output 64 carrying $\{\lambda_1, \lambda_5, \ldots, \lambda_{61}\}$ and output 66 carrying $\{\lambda_3, \lambda_7, \ldots, \lambda_{63}\}$. Similarly, interleaver 62 further interleaves the even wavelengths to produce output 68 carrying $\{\lambda_2, \lambda_6, \ldots, \lambda_{62}\}$ and output 69 carrying $\{\lambda_4, \lambda_8, \ldots, \lambda_{64}\}$. The overall interleaver based structure 49 is a band-modulo demultiplexer having an FSR of four times the wavelength frequency separation. A specific interleaver based example has been presented for particular values of N,K,M. However, it is to be understood that a suitable interleaver based structure could be developed for arbitrary values of N,K,M. The interleaver-based FSER device of FIG. 5 in combination with the preceding tuneable filter (as discussed previously with reference to FIG. 2) or in combination with following tuneable filters (as discussed previously with reference to FIG. 4) provide the tuneable demultiplexer functionality.

Figure 6:
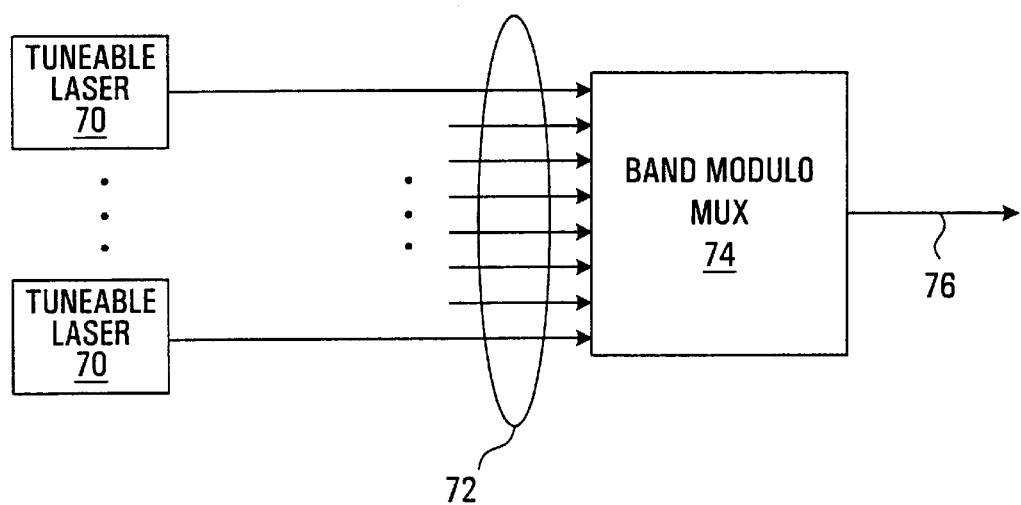
FIG. 6 is a schematic diagram of an optical multiplexer provided by another embodiment of the invention.

Referring now to FIG. 6, shown is a block diagram of an optical multiplexer according to an embodiment of the invention. The multiplexer has a band-modulo multiplexer 74 which is essentially the reciprocal function of the previously discussed band-modulo demultiplexer. The band-modulo multiplexer 74 takes a group of wavelengths that are separated from each other by the free spectral range into more than two ports 72 such that each port intakes a different group of wavelengths. More specifically, the inputs are capable of multiplexing the following wavelengths:

Input 1=any combination of $\lambda_1, \lambda_{M+1}, \lambda_{2M+1}, \ldots, \lambda_{(K-1)M+3}$.
Input 2=any combination of $\lambda_2, \lambda_{M+2}, \lambda_{2M+2}, \ldots, \lambda_{(K-1)M+2}$.
Input 3=any combination of $\lambda_3, \lambda_{M+3}, \lambda_{2M+3}, \ldots, \lambda_{(K-1)M+3}$.
. . .
Input M=any combination of $\lambda_M, \lambda_{2M}, \lambda_{3M}, \ldots, \lambda_{KM}$.

Wavelengths input to the wrong port are attenuated and lost.

The band-modulo multiplexer 74 outputs at output 76 all the input wavelengths in wavelength order. A tuneable laser 70 may be applied to any one of the input ports 72 with one of the multiple wavelengths available at the port. For example, on the second input port, one can transmit the second wavelength for any of one of the supported bands. The output of the wavelengths produced at output 76 may not all fall in the same band depending on the input wavelengths.

Another embodiment provides an optical wavelength multiplexer adapted to perform wavelength multiplexing of a plurality of input optical signals each containing a plurality of wavelengths. The multiplexer has a band-modulo multiplexer having a free spectral range, the band-modulo multiplexer having a plurality of inputs with one input for each of the plurality of input optical signals, the band-modulo multiplexer producing a multiplexed output signal, the band-modulo multiplexer being adapted to combine as the multiplexed output signal for each input any input optical wavelengths in a respective predetermined set of possible wavelengths, each possible wavelength in the set being separated by the free spectral range.

Another embodiment of the invention provides an optical network node per se equipped with either the above described optical multiplexer, the above described optical demultiplexer, or both. Such an optical network node is flexible in that the particular wavelengths to be added and/or dropped by the node can be selected by appropriate tuning of either the multiplexer and/or the demultiplexer.

Figure 7:
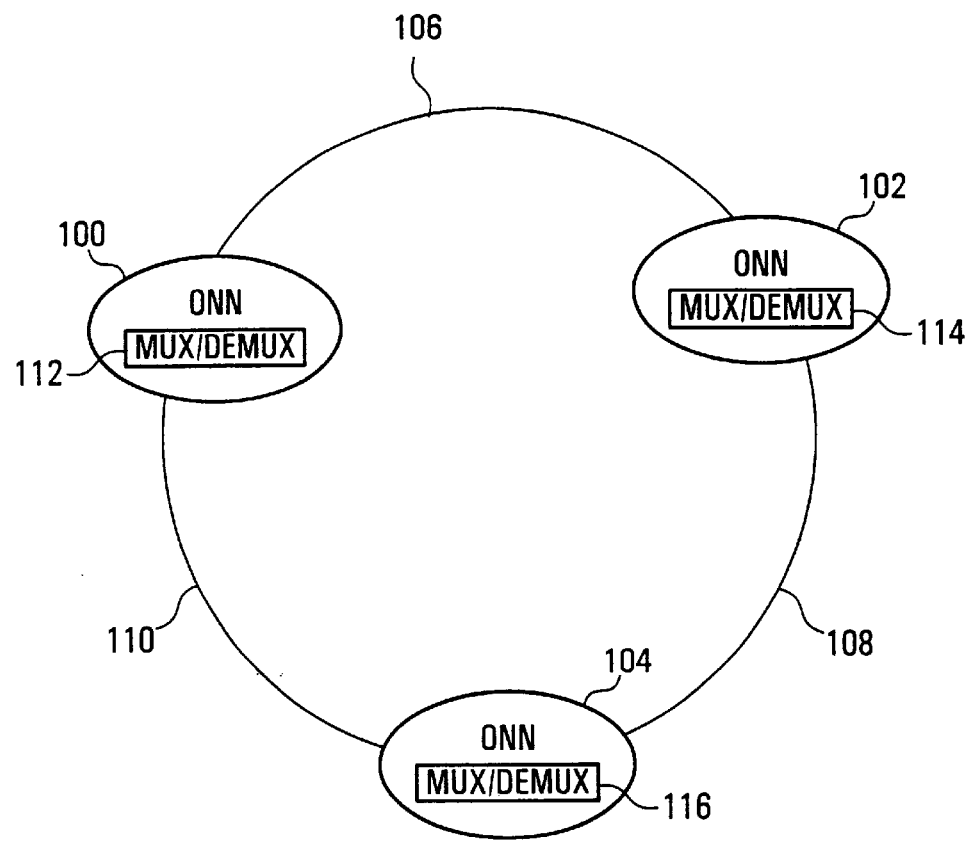
FIG. 7 is a schematic diagram of an optical network provided by another embodiment of the invention.

Another embodiment of the invention provides an optical network in which at least some of the optical network nodes are equipped with either the above described optical multiplexer, the above described optical demultiplexer, or both. Referring now to FIG. 7, shown is an example network provided by this embodiment of the invention which a number of ONNs (optical network nodes) 100, 102, 104 (only three shown) interconnected by optical network links 106, 108, 110. One or both of the previously described optical multiplexer and optical demultiplexer is installed in each of the optical network nodes 100, 102, 104, generally indicated as multiplexer/demultiplexer (mux/demux) 112, 114, 116. Such an optical network is flexible in that the particular wavelengths to be added and/or dropped by each node can be selected by appropriate tuning of either the multiplexer and/or the demultiplexer.

Figure 8:
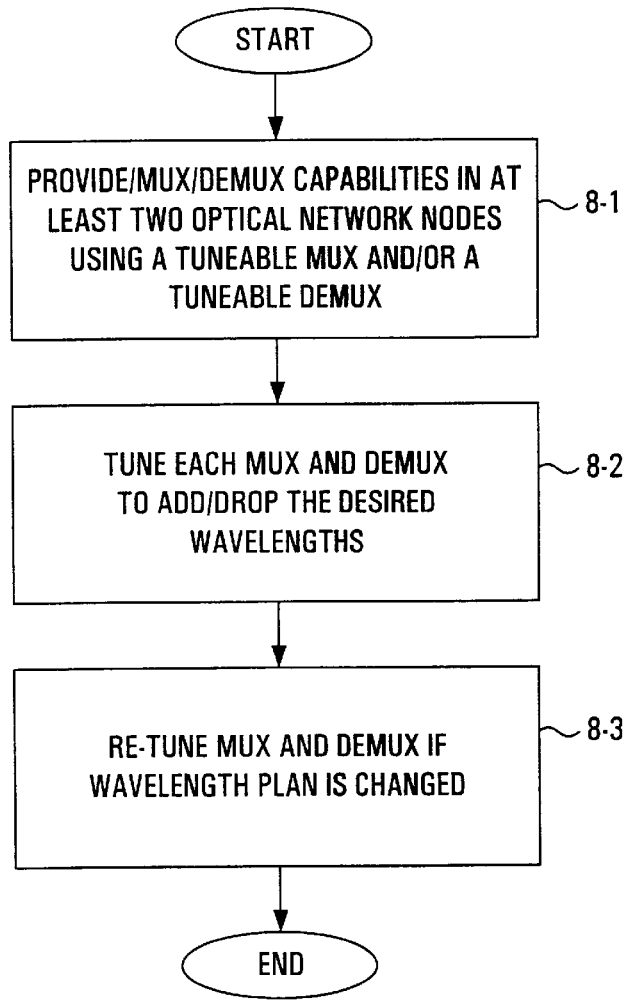
FIG. 8 is a flowchart of a method of wavelength planning, provided by another embodiment of the invention.

Yet another embodiment of the invention provides a method of wavelength management. Referring now to FIG. 8, the method involves first providing each of at least two optical network nodes with either or both of the above described multiplexer and demultiplexer capability using a tuneable multiplexer, and/or a tuneable demultiplexer (step 8-1). Preferably, this is done in each of the optical network nodes in an optical network. Next, after determining desired wavelengths to be added and/or dropped at each of the optical network nodes, each the filters in each multiplexer and/or demultiplexer are tuned so that the desired wavelengths are added and/or dropped at each optical network node (step 8-2). The step of tuning the multiplexer and/or demultiplexer may be done prior to network interconnection, or after network interconnection, and advantageously may be optionally repeated when the wavelength plan for the network is changed for any reason (step 8-3).

In the above described embodiments, a demultiplexer is provided which has a wavelength selective element, such as a tuneable filter, which is adapted to filter the input optical signal to produce an output containing a selected subset of the plurality of wavelengths. In some embodiments, the selected subset is one of a number of contiguous bands of wavelengths as exemplified above.

In another embodiment, the wavelength selective element is adapted to produce a selected subset which is a completely arbitrary set. However, in this case preferably the selected subset does not include any wavelengths separated by multiples of the FSR of the FSR device as this would result in collision. In a four band system for example, the first wavelength of the first band, the second wavelength of the third band, the fourth wavelength of the third band, and the third wavelength of a fourth band could be filtered and demultiplexed successfully without collision.

In another embodiment, the wavelength selective element is implemented with a bank of wavelength selective components, such as bandpass filters for example, each passing a respective band, and a switch to select between the components.

Most generally, any wavelength selective element may be employed to extract certain wavelengths from the optical signal. For example, a fixed wavelength selective element may be employed which passes only a pre-determined band.

Figure 9:
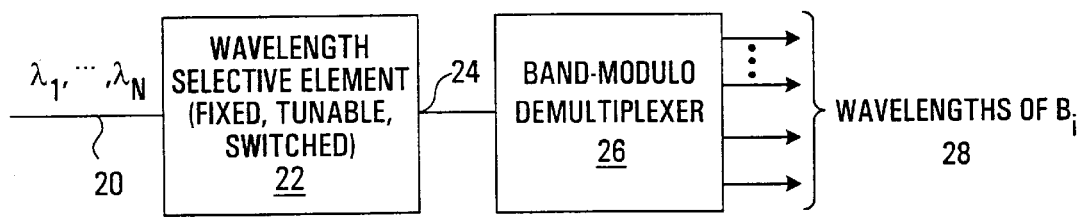
FIG. 9 is a block diagram of an optical demultiplexer provided by an embodiment of the invention.
Figure 10:
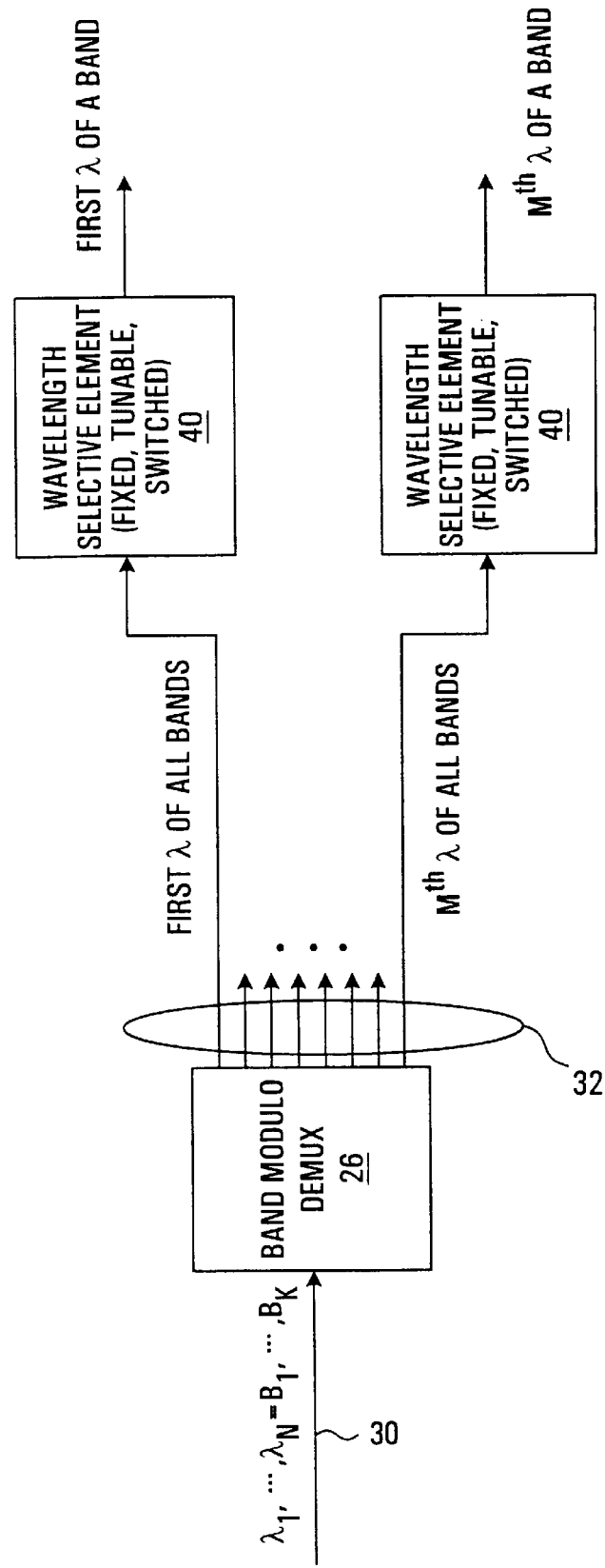
FIG. 10 is a block diagram of an optical demultiplexer according to another embodiment of the invention.

FIGS. 9 and 10 are versions of FIGS. 2 and 4 respectively in which these generalized wavelength selective elements are specifically shown.

Numerous modifications and variations of the present invention are possible in light of the above teachings. It is therefore to be understood that within the scope of the appended claims, the invention may be practised otherwise than as specifically described herein.

We claim:

1. An optical wavelength demultiplexer adapted to perform wavelength demultiplexing of an input optical signal containing a plurality of wavelengths, the demultiplexer comprising:

a wavelength selective element adapted to act upon the input optical signal to produce an output containing a selected subset of the plurality of wavelengths;

a band-modulo demultiplexer having a free spectral range, the band-modulo demultiplexer being connected to receive the output of the wavelength selective element, the free spectral range defining a plurality of FSR (Free Spectral Range) bands;

wherein the wavelength selective element is operable over a range spanning at least two different FSR bands of the band-modulo demultiplexer;

wherein wavelength selective element is adapted to produce the output containing the selected subset consisting of an arbitrary subset of wavelengths from the plurality of wavelengths subject to a constraint that no two wavelengths in the arbitrary subset are separated by a multiple of the free spectral range;

wherein the wavelength selective element comprises a bank of components which are individually selectable, each component being adapted to select a respective contiguous set of wavelengths.

2. A demultiplexer according to claim 1 wherein each component is a bandpass filter having a passband.

3. A demultiplexer according to claim 1 wherein a guardband is provided between sets of contiguous wavelengths, and wherein the FSR is substantially equal to a width of the contiguous set of wavelengths plus the guardband.

4. An optical wavelength demultiplexer adapted to perform wavelength demultiplexing of an input optical signal containing a plurality of wavelengths, the demultiplexer comprising:

a band-modulo demultiplexer having a free spectral range, the band-modulo demultiplexer being connected to receive the input optical signal, and adapted to act upon the input optical signal to produce a plurality of intermediate output signals each containing one or more of the plurality of wavelengths each separated by the free spectral range;

for each of at least one of the plurality of intermediate output signals, a respective wavelength selective device adapted to produce a selected subset of the intermediate output signal's one or more wavelength channels;

wherein the wavelength selective devices comprise a plurality of static bandpass filters which are individually selectable, each bandpass filter having a passband width substantially equal to the free spectral range of the band-modulo demultiplexer.

5. A demultiplexer according to claim 4 wherein each wavelength selective element is adapted to filter an arbitrary subset of wavelengths from the plurality of wavelengths subject to a constraint that no two wavelengths are separated by a multiple of the free spectral range.

6. An optical wavelength demultiplexer adapted to perform wavelength demultiplexing of an input optical signal containing a plurality of wavelengths, the demultiplexer comprising:

a band-modulo demultiplexer having a free spectral range, the band-modulo demultiplexer being connected to receive the input optical signal, and adapted to act upon the input optical signal to produce a plurality of intermediate output signals each containing one or more of the plurality of wavelengths each separated by the free spectral range; for each of at least one of the plurality of intermediate output signals, a respective wavelength selective device adapted to produce a selected subset of the intermediate output signal's one or more wavelength channels;

wherein the wavelength selective devices comprise a plurality of static bandpass filters which are individually selectable, with a guardband being defined between a passband of each bandpass filter, such that for each filter, the guardband plus passband width is substantially equal to the free spectral range of the band-modulo demultiplexer.

7. An optical wavelength demultiplexer adapted to perform wavelength demultiplexing of an input optical signal containing a plurality of wavelengths, the demultiplexer comprising:

a wavelength selective element adapted to act upon the input optical signal to produce an output containing a selected subset of the plurality of wavelengths, the wavelength selective element comprising a plurality of components each adapted to select a respective subset of the plurality of wavelengths, and switching circuitry for selecting one of the plurality of components to be active at a given time;

a band-modulo demultiplexer having a free spectral range, the band-modulo demultiplexer being connected to receive the output of the wavelength selective element.

8. An optical wavelength multiplexer adapted to perform wavelength multiplexing of a plurality of input optical signals each containing a plurality of wavelengths, the multiplexer comprising:

a band-modulo multiplexer having a free spectral range, the band-modulo multiplexer having a plurality of inputs with one input for each of the plurality of input optical signals, the band-modulo multiplexer producing a multiplexed output signal, the band-modulo multiplexer being adapted to combine as the multiplexed output signal for each input any input optical wavelengths in a respective predetermined set of possible wavelengths, each possible wavelength in the set being separated by the free spectral range.

9. An optical wavelength demultiplexer adapted to perform wavelength demultiplexing of an input optical signal containing a plurality of wavelengths, the demultiplexer comprising:

a tuneable filter adapted to filter the input optical signal to produce an output containing a selected subset of the plurality of wavelengths;

a band-modulo demultiplexer having a free spectral range, the band-modulo demultiplexer being connected to receive the output of the filter;

wherein the band-modulo demultiplexer has an input capable of receiving N wavelengths $\{\lambda_1, \lambda_2, \ldots, \lambda_N\}$, and has M outputs defined by Output 1=$\lambda_1, \lambda_{M+1}, \lambda_{2M+1}, \ldots, \lambda_{(K-1)M+1}$.

Output 2=$\lambda_2, \lambda_{M+2}, \lambda_{2M+2}, \ldots, \lambda_{(K-1)M+2}$.

Output 3=$\lambda_3, \lambda_{M+3}, \lambda_{2M+3}, \ldots, \lambda_{(K-1)M+3}$.

. . .

Output M=$\lambda_M, \lambda_{2M}, \lambda_{3M}, \ldots, \lambda_{KM}$.

wherein the N wavelengths are logically divided into K bands of M wavelengths each, with N=K×M;

wherein the actual wavelengths output by each of the M outputs is defined by the range of wavelengths passed to the band-modulo demultiplexer by the filter;

wherein the N wavelengths are not equally spaced, with the spacing in each band being equal to the spacing in each other band.

10. An optical wavelength multiplexer adapted to perform wavelength multiplexing of a plurality of input optical signals containing a plurality of wavelengths, the multiplexer comprising:

a band-modulo multiplexer having a free spectral range, the band-modulo multiplexer having a plurality of inputs with one input for each of the plurality of input optical signals, the band-modulo multiplexer producing a multiplexed output signal, the band-modulo multiplexer being adapted to combine as the multiplexed output signal for each input any input optical wavelengths in a respective predetermined set of possible wavelengths, each possible wavelength in the set being separated by the free spectral range;

at least one tuneable laser, each tuneable laser being connected to a respective input to the band-modulo multiplexer, and each tuneable laser being tuneable to at least one of the respective predetermined set of possible wavelengths.

11. A multiplexer according to claim 10 wherein each tuneable laser is tuneable to each of the respective predetermined set of possible wavelengths.

12. A multiplexer according to claim 11 wherein the plurality of wavelengths comprise $\lambda_1, \lambda_2, \ldots \lambda_N$, the band-modulo multiplexer having M inputs capable of receiving respective predetermined sets of wavelengths defined as follows:

Input 1=any combination of $\lambda_1, \lambda_{M+1}, \lambda_{2M+1}, \ldots, \lambda_{(K-1)M+3}$.

Input 2=any combination of $\lambda_2, \lambda_{M+2}, \lambda_{2M+2}, \ldots, \lambda_{(K-1)M+2}$.

Input 3=any combination of $\lambda_3, \lambda_{M+3}, \lambda_{2M+3}, \ldots, \lambda_{(K-1)M+3}$.

. . .

Input M=any combination of $\lambda_M, \lambda_{2M}, \lambda_{3M}, \ldots, \lambda_{KM}$.

13. A multiplexer according to claim 11 wherein the band-modulo multiplexer comprises a grating-based structure.

14. A multiplexer according to claim 13 wherein the grating-based structure is an Eschelle grating based structure.

15. A multiplexer according to claim 11 wherein the band-modulo multiplexer comprises an interleaver structure.

16. An optical work comprising an interconnected plurality of optical network nodes according to claim 15.

17. An optical network node comprising at least one of an optical multiplexer and an optical demultiplexer;

the optical demultiplexer when present being adapted to perform wavelength demultiplexing of an input optical signal containing a plurality of wavelengths, the demultiplexer comprising:
a tuneable filter adapted to filter the input optical signal to produce an output containing a selected subset of the plurality of wavelengths; and
a band-modulo demultiplexer having a free spectral range, the band-modulo demultiplexer being connected to receive the output of the filter;

the optical multiplexer when present being adapted to perform wavelength multiplexing of a plurality of input optical signals containing a plurality of wavelengths, the multiplexer comprising:
a band-modulo multiplexer having a free spectral range, the band-modulo multiplexer having a plurality of inputs with one input for each of the plurality of input optical signals, the band-modulo multiplexer producing a multiplexed output signal, the band-modulo multiplexer being adapted to combine as the multiplexed output signal for each input any input optical wavelengths in a respective predetermined set of possible wavelengths, each possible wavelength in the set being separated by the free spectral range; and
at least one tuneable laser, each tuneable laser being connected to a respective input to the band-modulo multiplexer, and each tuneable laser being tuneable to the respective predetermined set of possible wavelengths.

18. A method of wavelength management comprising:
providing each of at least two optical network nodes with at least one of a tuneable optical multiplexer and a tuneable optical demultiplexer, tuneability of the multiplexer being achieved through a combination of tuneable lasers and an FSR (free spectral range) device, and tuneability of the demultiplexer being achieved through a combination of tuneable bandpass filtering and an FSR device;
after determining desired wavelengths to be added and/or dropped at each of the optical network nodes, tuning each of the lasers and/or filters in each multiplexer and/or demultiplexer so that the desired wavelengths are added and/or dropped at each optical network node.

19. A method of performing optical wavelength demultiplexing comprising:
tuneably filtering an input optical signal containing a plurality of wavelengths to produce an output containing a selected subset of the plurality of wavelengths;
passing the selected subset of the plurality of wavelengths through a band-modulo demultiplexer having a free spectral range;
defining equal width bands of consecutive wavelengths within the plurality of wavelengths;
wherein tuneably filtering the input optical signal containing a plurality of wavelengths to produce an output containing a selected subset of the plurality of wavelengths results in an output containing the wavelengths of one of the bands of consecutive wavelengths;
wherein the FSR is selected to equal a separation between corresponding wavelengths in consecutive bands.

20. A method of performing optical wavelength multiplexing comprising:
tuning each of a plurality of lasers to a respective wavelength, each wavelength belonging to a respective predetermined set of possible wavelengths to produce a respective laser output;
multiplexing the laser outputs using a band-modulo multiplexer having a free spectral range.

21. A method according to claim 20 adapted for use with a band-modulo multiplexer having a plurality of inputs with one input connected to each of the plurality of laser outputs, each input being capable of receiving a respective plurality of wavelengths separated by the free spectral range, wherein each laser is tuned such that its output is one of the respective plurality of wavelengths of the input to which it is connected.

* * * * *

UNITED STATES PATENT AND TRADEMARK OFFICE
CERTIFICATE OF CORRECTION

PATENT NO. : 6,754,413 B2  Page 1 of 1
APPLICATION NO. : 10/259597
DATED : June 22, 2004
INVENTOR(S) : J. B. Bacque et al.

It is certified that error appears in the above-identified patent and that said Letters Patent is hereby corrected as shown below:

Column 11, line 6, cancel the text beginning with "16. An optical work" to and ending "according to claim 15." in column 11, line 7.

Column 11, line 41, insert text:

--17. An optical network comprising and interconnected plurality of optical network nodes according to claim 16.--.

Column 11, line 8, "17" is corrected to read as --16--.

Signed and Sealed this

Seventeenth Day of February, 2009

JOHN DOLL
*Acting Director of the United States Patent and Trademark Office*